Jan. 2, 1945.  C. G. MAKRENOS  2,366,418
AUTOMOBILE JACK
Filed Feb. 6, 1943

INVENTOR.
CONSTANTENE G. MAKRENOS
BY
A. B. Bowman
ATTORNEY

Patented Jan. 2, 1945

2,366,418

UNITED STATES PATENT OFFICE 2,366,418

AUTOMOBILE JACK

Constantene G. MaKrenos, San Diego, Calif.

Application February 6, 1943, Serial No. 474,990

3 Claims. (Cl. 254—86)

My invention relates to an automobile jack, more particularly one that is installed in connection with the frame of the automobile and carried thereby at all times and the objects of my invention are:

First, to provide an automobile jack that is in position in connection with the automobile at all times and may be shifted to a position for raising one of the wheels;

Second, to provide an automobile jack of this class which is operable from the rear of the automobile;

Third, to provide an automobile jack of this class in which the lift portion thereof may be shifted transversely from one side to the other of the automobile;

Fourth, to provide an automobile jack of this class in which the operating structure is built in connection with the frame of the automobile;

Fifth, to provide an automobile jack of this class with means for indicating the position of the jack without stooping to look under the automobile;

Sixth, to provide an automobile jack of this class in which the jack is operated from the rear side of the automobile without stooping as well as the shifting of the jack laterally of the frame of the automobile;

Seventh, to provide an automobile jack of this class which may be built into the construction of the automobile when the automobile is constructed, if desired;

Eighth, to provide an automobile jack of this class which is very simple and economical of construction, easy to operate, efficient in its action and which will not readily deteriorate or get out of order.

Figure 1:
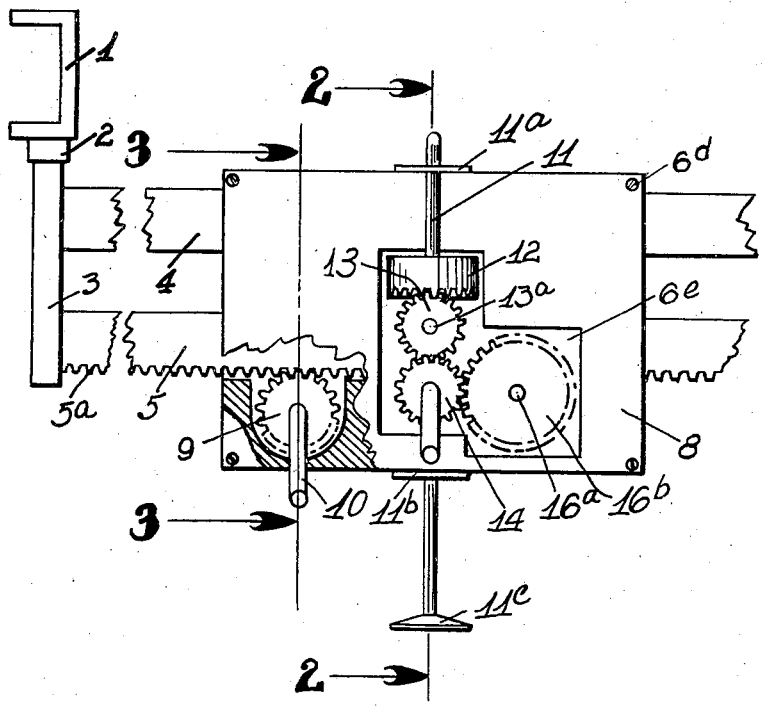
Figure 2:
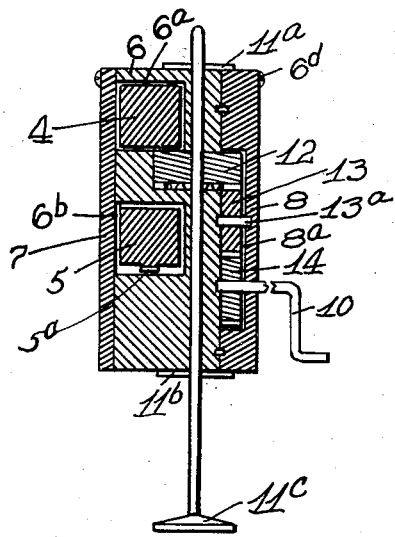
Figure 3:
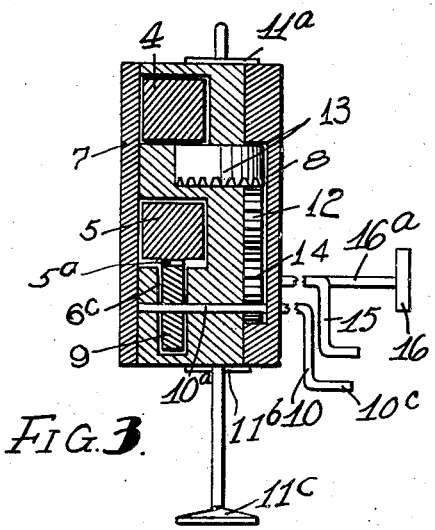

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a fragmentary rear elevational view of my automobile jack shown positioned on one side of the frame member of the automobile showing the supporting portion of the jack down in position ready for use and showing portions removed, broken away and in section to facilitate the illustration; Fig. 2 is a sectional view taken from the line 2—2 of Fig. 1 showing some of the parts in elevation to facilitate the illustration and Fig. 3 is a sectional view taken from the line 3—3 of Fig. 1.

Similar characters of reference refer to similar parts and portions throughout the several views of the drawing.

The vehicle frame member 1, base members 2, vertical supports 3, guide members 4 and 5, casing members 6, 7 and 8, gear 9, crank shaft 10, screw shaft 11, gears 12, 13 and 14, crank member 15 and heighth indicating disc 16 constitute the principal parts and portions of my automobile jack.

Secured to the automobile frame members 1 at opposite sides of the automobile are base members 2, it being noted that only one frame member and base member is shown in the drawing. Secured to these base members 2 are vertical supports 3 which extend downwardly some distance below the frame members 1 and shown best in Fig. 1 of the drawing.

Secured near the upper side of the vertical supports 3 is the guide member 4 which extends transversely across the automobile. Secured downwardly therefrom in spaced relation therefrom near the lower end of the vertical supports 3 is another guide member 5 on which the casing members 7 and 8 are shiftably mounted so that the casing may be shifted transversely on the guide members 4 and 5.

The casing members 6, 7 and 8 form a substantially rectangular box-shaped casing member, as shown best in Figs. 1 and 2 of the drawing. The casing member 6 is provided with a slot 6a extending through the same in which is adapted to fit the guide member 4, as shown best in Figs. 2 and 3 of the drawing. This casing member is also provided with another slot spaced below the same designated 6b which is adapted to fit the guide member 5. These slots are positioned in the front sides of the casing and are covered by means of the casing member 7 which is a flat plate-like member which fits over and is secured to the front side of the casing member 6 against which the front sides of the members 4 and 5 rest. The guide member 5 is provided in its lower side with gear teeth 5a its full length forming a gear rack with which meshes a gear 9 which is secured on a crank shaft 10, the inner end 10a of which is journalled in the casing 6 on opposite sides of an opening 6c formed to receive and permit the revolution of the gear 9, all as shown best in Fig. 3 of the drawing. This crank shaft 10 is provided with a crank portion 10b and a handle portion 10c. The portion 10a is also journalled in the casing member 8 and extends backwardly some distance so that the handle portion 10c may be reached from the rear side of the automobile, preferably so that the crank portion may be turned between the rear side of the automobile and the rear bumper.

It will be here noted that by turning the crank 10b the casing consisting of the members 6, 7 and 8 may be shifted from side to side of the automobile and stopped by an engagement with the vertical support 3 at opposite sides.

Journalled vertically in the casing member 6 is a screw shaft 11 which extends through the casing member 6 and some distance at opposite sides, as shown in the drawing. This shaft 11 is journalled on the casing by means of screw-threaded journal plates 11a and 11b at the upper and lower sides respectively of the member 6. Screw-threaded on this screw shaft 11 between the guide members 4 and 5 and journalled in the casing 6 is a gear member 12 which is shaped as shown best in Fig. 1 of the drawing with gear teeth around its outer edge and meshing therewith is a gear 13 which is secured to a shaft 13a which is journalled in casing members 6 and 8, as shown best in Fig. 2 of the drawing, it being noted that there is a portion 8a cut out of the inner side of the casing 8 in which the gear 13 and the side of the gear 12 revolves in meshed relation to each other. Meshing with this gear 13 is another gear 14 which is also revolubly mounted in the recessed portion 8a of the member 8 and this gear portion is secured on a crank member 15, the shaft portion 15a of which is journalled in the casing members 6 and 8 and extends backwardly therefrom some distance and is provided with a crank at its extended end. The screw shaft 11 is provided with a foot portion 11c at its lower end which is adapted to rest on the ground when using the jack and may be shifted upwardly against the plate 11b when raised and the jack is not in operation.

The casing members 6, 7 and 8 are secured together in any suitable manner, preferably by screws 6d.

The operation of my automobile jack is substantially as follows: When the jack is not in use the foot member 11c is raised up by turning the crank 15 in one direction and it is lowered by turning the crank 15 in the opposite direction through the gears 14, 13 and 12 respectively turning the shaft 11 which causes it to rise and lower in the screw-threaded plate 11a and 11b secured to the upper and lower side of the casing members 6. When it is desired to shift the jack to either side of the automobile, the crank 10 is turned, which crank is journalled in the casing member 6 and therefore causes the gear 9 to shift the casing 6 along the gear rack 5a to the position desired. Upon cranking the jack by turning the gear 14, the indicating disc 16 is turned by means of a shaft 16a on which is mounted a gear 16b mounted in a recess 6e in the casing member 6 and meshing with the gear 14. This shaft 16a is sufficient in length to extend to the rear side of the automobile so that the disc may be readily read from the back side of the automobile.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention what I claim as new and desire to secure by Letters Patent is:

1. In an automobile jack of the class described, the combination with the side frame members of an automobile, of vertically spaced guide members secured in connection with said frame members and extending crosswise of the automobile body, one of said guide members forming a gear rack, a casing shiftably mounted on said guide members, gear means in connection with said casing and guide members for shifting said casing on said guide members, a screw shaft vertically mounted in said casing and arranged to extend below the same, and gear and crank means in connection therewith journalled in said casing and arranged to raise and lower said screw shaft.

2. In an automobile jack of the class described, the combination with the side frame members of an automobile, of vertically spaced guide members secured in connection with said frame members and extending crosswise of the automobile body, one of said guide members forming a gear rack, a casing shiftably mounted on said guide members, gear means in connection with said casing and guide members for shifting said casing on said guide members, a screw shaft vertically mounted in said casing and arranged to extend below the same, gear and crank means in connection therewith journalled in said casing and arranged to raise and lower said screw shaft, and an indicating disc in cooperative relation with said gear means.

3. In an automobile jack of the class described, the combination with the side frame members of an automobile, of vertically spaced guide members secured in connection with said frame members and extending crosswise of the automobile body, one of said guide members forming a gear rack, a casing shiftably mounted on said guide members, gear means in connection with said casing and guide members for shifting said casing on said guide members, a screw shaft vertically mounted in said casing and arranged to extend below the same, gear and crank means in connection therewith journalled in said casing and arranged to raise and lower said screw shaft, an indicating disc in cooperative relation with said gear means, and crank means in connection with said gears extending backwardly some distance.

CONSTANTENE G. MAKRENOS.